Figure 1:
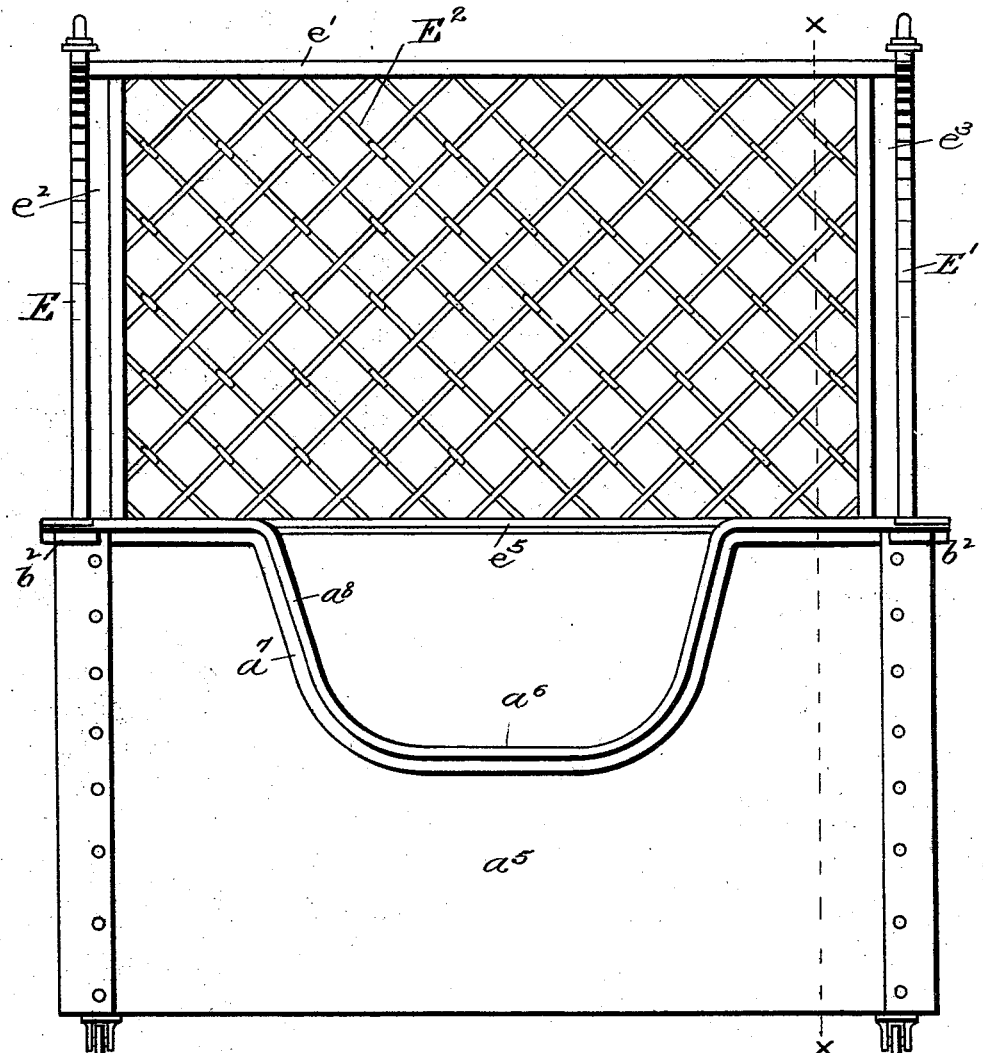

(No Model.) 3 Sheets—Sheet 2.

T. B. FITZPATRICK.
MERCHANDISE TRUCK.

No. 530,030. Patented Nov. 27, 1894.

WITNESSES
J. M. Dolon.
J. W. Cummings

INVENTOR
Thomas B. Fitzpatrick
by his attys.
Clarke & Raymond (No Model.)

T. B. FITZPATRICK.
MERCHANDISE TRUCK.

No. 530,030. Patented Nov. 27, 1894.

WITNESSES
J. M. Dolan
J. W. Cummings

INVENTOR
Thomas B. Fitzpatrick
by his attys
Clarke & Raymond

UNITED STATES PATENT OFFICE.

THOMAS B. FITZPATRICK, OF NEWTON, MASSACHUSETTS.

MERCHANDISE-TRUCK.

SPECIFICATION forming part of Letters Patent No. 530,030, dated November 27, 1894.

Application filed December 23, 1893. Renewed October 29, 1894. Serial No. 527,322. (No model.)

*To all whom it may concern:*

Be it known that I, THOMAS B. FITZPATRICK, of Newton, in the county of Middlesex and State of Massachusetts, a citizen of the United States, have invented a new and useful Improvement in Merchandise-Trucks, of which the following is a full, clear, and exact description, reference being had to the accompanying drawings, forming a part of this specification, in explaining its nature.

In merchandise trucks used for collecting and transporting goods in large jobbing and wholesale houses, it is desirable that their capacity be made available to suit the different requirements. It is not desirable to obtain this increase by adding to a desirable length or to the width of the trucks now commonly used. At any rate, the best way for accomplishing the purpose seems to me to be obtainable by increasing the height of the truck and providing it with an additional shelf or support, when such additional height is used. It is desirable also that such additional superposed section of the truck be used only when necessary, because it is for many reasons requisite that the truck be not of a height to shut off the view of or conceal the employé using it. For these reasons, I have constructed a merchandise truck which is of a telescopic nature and extensible vertically in an upward direction to provide the increased carrying capacity, when desired. To obtain this result, the main section of the truck is provided with recesses as well as guiding sections upon the ends and back of the truck of a size and construction to receive a vertically sliding frame, which frame preferably has end and back sections, and is normally lowered and contained in said walls or chambers, and is only raised to its elevated position when it is desired that the truck shall have increased capacity. At such times, it is generally desirable to employ a separate support for the additional goods, in order that their weight may not crush the goods already in the truck, and in order that they may pack to better advantage, and I use with the vertically movable ends and back a rolling shelf, which, when the upper section is in its lowered position, assumes a vertical position in the back chamber or recess of the lower case, the upper edge thereof being in position to be readily grasped by the hand, and this rolling shelf is used for the purpose of elevating and lowering the said section, the draft upon the front edge in a forward direction, serving to lift the lower section as well as to draw the shelf to a horizontal position. I would say, however, that the upper section may be used without the shelf, when it is desired to extend the ends and back thereof without providing an additional support.

The lower section of the truck may be constructed in any suitable way and of any suitable material, so long as it contains provision for receiving the upper section and permitting its vertical movement in relation thereto, and I would here state that I do not confine myself to the particular form of construction herein specified for carrying the invention into effect.

Figure 2:
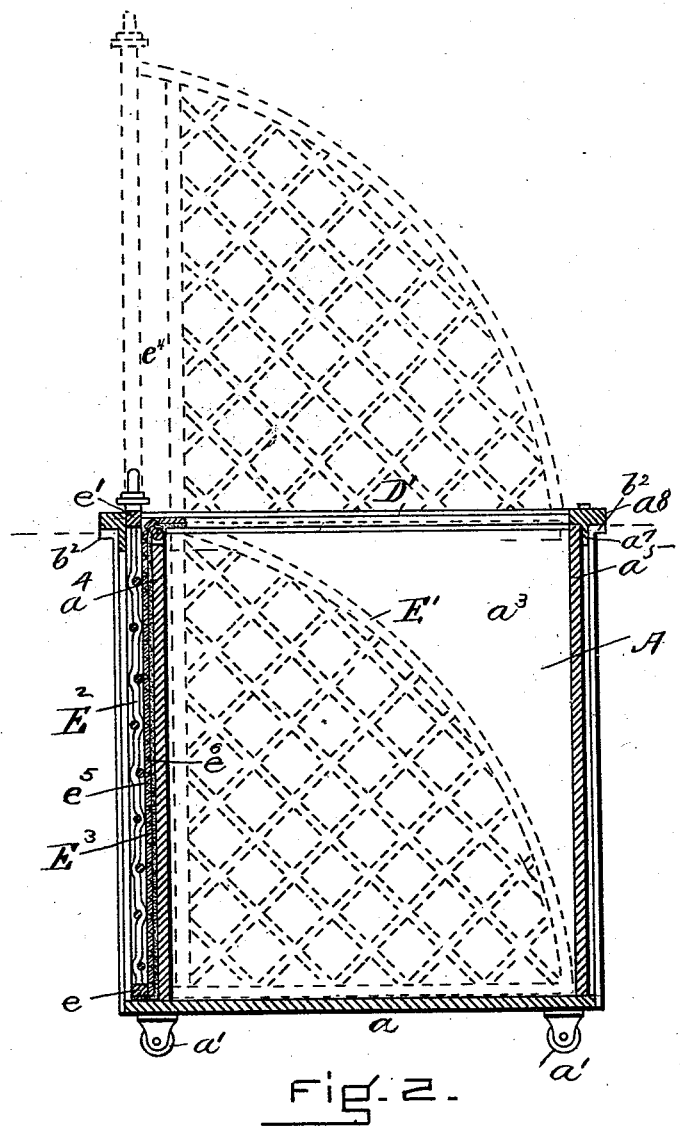
Figure 3:
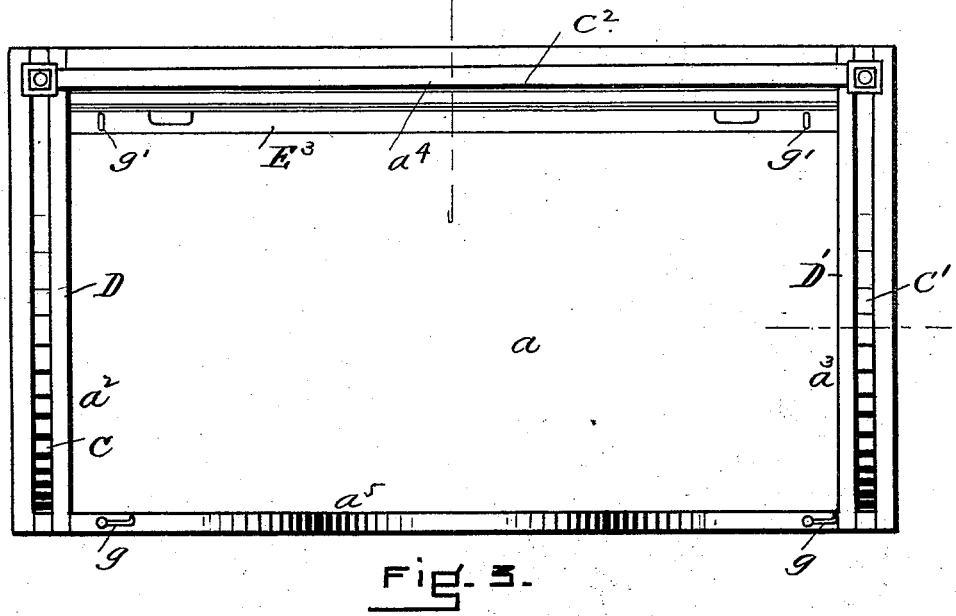
Figure 4:
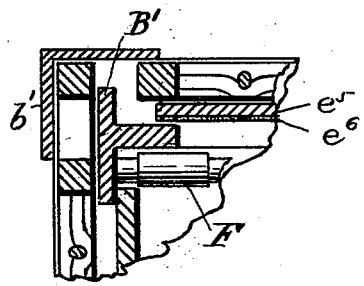
Figure 6:
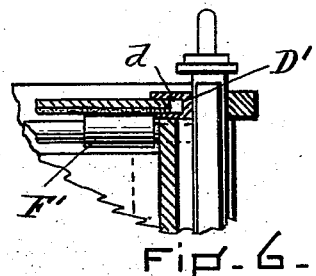
Figure 5:
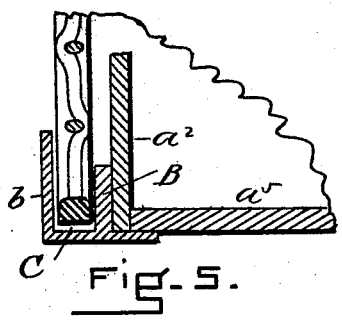
Figure 7:
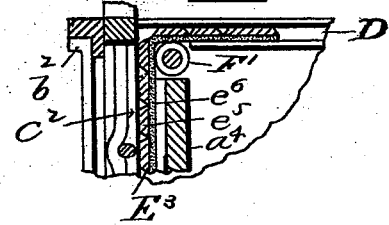

Referring to the drawings,—Figure 1 is a view in front elevation of a merchandise truck having the features of my invention. Fig. 2 is a view principally in cross vertical section upon the dotted line $x$—$x$ of Fig. 1. Fig. 3 is a plan view of the truck. Figs. 4, 5, 6, and 7 are detail views illustrating the construction and to which reference will hereinafter be made.

The main section A of the truck has the bottom $a$ bearing suitable rolls $a'$, the end walls $a^2$ $a^3$, back wall $a^4$, and front wall $a^5$. The front wall may be cut downward from its upper edge as represented at $a^6$ Fig. 1.

The walls may be of wood, of wire, or of thin sheet metal. For strength, I prefer the latter, and I also prefer to protect the front edge of the front plate by the angle piece $a^7$, having a flange $a^7$ to lap upon the upper edge of the plate $a^5$, and a horizontally extending flange $a^8$ to form a relatively wide upper edge.

The end and back and front plates at the corners are reinforced and braced by vertical T-shaped posts B B' (see Figs. 4 and 5) which show respectively detail views in horizontal section of one of the front corners and one of the rear corners. The front angle piece B has also a second angle section $b$, which provides a recess or guide way or cell C for one end of the truck. There is another angle piece $b'$ at the rear corner. These angle pieces are fastened to the bottom of the truck and at the top are connected by horizontal angle pieces similar to the one forming the top of the front plate $a^5$, and a section of one of which marked $b^2$ is represented in Fig. 2 and the rear one forming the upper edge of the back plate is also represented in Fig. 2.

The recess, guide, or cell upon the right side of the truck is lettered C′, and at the rear or back of the truck C². Extending along the tops of the end walls $a^2$ $a^3$ are horizontal pieces D D′ which preferably extend to the rear or back sections of the angle plates $b'$, and furnish upon their inner edges the guide ways $d$ (see Fig. 6), for the edges of the roller shelf.

The upper section comprises the ends E E′ and the back E². The ends are of a size to slide freely in the end recesses or guides C C′, and the back slides freely in the recess C²; and they are connected together at their lower ends by a cross bar $e$, and at their upper ends by the bar $e'$, there being in the frame the longer recesses $e^2$ $e^3$ and $e^4$, one at each end, to permit the bars $a^2$ $a^3$ which form tie rods or bars and a longitudinal tie bar to extend across.

To the lower edge of the back part E² of the movable section is secured the roller shelf E³. This is made of narrow strips of wood $e^5$, horizontally arranged and otherwise suitably formed and attached to the flexible connecting medium or hinge $e^6$. This roller shelf runs over the rolls F F′ placed at the upper edge of the back plate $a^4$ and suitably supported, and the upper edge $e^7$ of the roller shelf near the section E is depressed and projects sufficiently over the rolls to provide means by which the shelf may be grasped. (See Fig. 2.) The edges of the shelf run in the guides D, as above indicated. There may be other rolls employed for steadying the movable section in its guide ways or recesses, and for relieving the friction as it is lifted.

In use, when it is desired to increase the capacity of the truck, the front edge of the shelf is laid hold of, and by drawing it forward to cover the lower section of the truck, the ends and back of the section are brought into position above the first. The said section thus elevated, is locked in position by hooks $g$, which engage eyes $g'$ of the front edge of the roller shelf (see Fig. 3), or in any other desired way. As before intimated, the roller shelf in some instances may be dispensed with, when straps may be employed for lifting the upper section to place, or there may be used in connection with or in addition to the roller shelf, other means for lifting the vertically movable section.

I prefer that the upper section E be made of intermeshed light wire or other light strands, both for the purpose of obtaining strength and lightness, and also for the purpose of providing a structure which will not entirely shut off view when elevated.

Having thus fully described my invention, I claim and desire to secure by Letters Patent of the United States—

1. A merchandise truck, comprising a lower or main section A and an upper section E, vertically movable in relation to the lower section, as and for the purposes described.

2. A merchandise truck comprising the two sections A and E, one of which constantly occupies the same position, and the other of which is adapted to occupy practically the position of the first, or to be lifted to a position above it, as and for the purposes described.

3. In a merchandise truck, the main section A provided with guides for a vertically movable section E, and said vertically movable section E movable in said guides from a position of the same level as that of the section A to a position above it, whereby the capacity of the truck is increased, as and for the purposes described.

4. In a merchandise truck, a section E, bearing a telescopic relation to the main section, in a vertical direction, as and for the purposes described.

5. A merchandise truck, having the main section A, vertically movable section E, and a roller shelf attached to the lower edge of the movable section, and movable with it from a vertical to a horizontal position, as and for the purposes described.

6. In a merchandise truck, a movable section E provided with a roller shelf E³, as and for the purposes described.

7. A merchandise truck, provided with a roller shelf E³, substantially as described.

8. In a merchandise truck, the main section A having supports for holding in a horizontal position a roller shelf and a vertically movable frame E, as and for the purposes described.

9. A merchandise truck A, having vertical guides for a vertically movable section E, and horizontal supports for a roller shelf, in combination with the movable section E, and the said roller shelf, as and for the purposes described.

10. A merchandise truck having a vertically movable section E, the back and ends of which are made of strands of wire or strands of other suitable material, as and for the purposes described.

11. A merchandise truck A having the vertically movable extension E, provided with open work ends and back, as and for the purposes described.

12. A merchandise truck, having the guides for the section E, a roller shelf $E^3$ with said section, and anti-friction rolls F F', as and for the purposes described.

13. A merchandise truck, having the end walls $a^2$ $a^3$, the rear wall $a^4$, the front wall $a^5$, and the bottom $a$, the angle pieces B B' $b$ $b'$ united together as specified, and forming the recesses C C' $C^2$, the guiding rails D D', the vertically movable section E, having the ends $e^2$ $e^3$ and the back $e'$, the roller shelf $E^3$ fastened at its lower end to the back $e'$, and the rolls F F', as and for the purposes described.

THOMAS B. FITZPATRICK.

Witnesses:
F. F. RAYMOND, 2d,
J. M. DOLAN.